US008073243B2

United States Patent

(12) United States Patent
Mareachen et al.

(10) Patent No.: US 8,073,243 B2
(45) Date of Patent: Dec. 6, 2011

(54) REPLACING IMAGE INFORMATION IN A CAPTURED IMAGE

(75) Inventors: Russell D. Mareachen, Winfield, IL (US); Boaz J. Super, Westchester, IL (US); Sek M. Chai, Streamwood, IL (US); Tianli Yu, Foster City, CA (US); Bei Tang, Palatine, IL (US)

(73) Assignee: General Instrument Corporation, Horsham, PA (US)

( * ) Notice: Subject to any disclaimer, the term of this patent is extended or adjusted under 35 U.S.C. 154(b) by 859 days.

(21) Appl. No.: 12/129,775

(22) Filed: May 30, 2008

(65) Prior Publication Data

US 2009/0297061 A1 Dec. 3, 2009

(51) Int. Cl.
*G06K 9/00* (2006.01)
*G06K 9/34* (2006.01)

(52) U.S. Cl. ......................... 382/154; 382/103; 382/173

(58) Field of Classification Search .................. 382/154, 382/103, 173

See application file for complete search history.

(56) References Cited

U.S. PATENT DOCUMENTS 6,798,897 B1 9/2004 Rosenberg
6,891,966 B2 * 5/2005 Chen ............................ 382/145
6,912,313 B2 * 6/2005 Li ................................ 382/219
7,085,409 B2 * 8/2006 Sawhney et al. .............. 382/154
7,212,663 B2 5/2007 Tomasi
7,512,262 B2 * 3/2009 Criminisi et al. ............. 382/154
7,676,081 B2 * 3/2010 Blake et al. ................... 382/164
7,720,282 B2 * 5/2010 Blake et al. ................... 382/173
2007/0035530 A1 2/2007 Van Geest et al.
2007/0110298 A1 * 5/2007 Graepel et al. ................ 382/154

FOREIGN PATENT DOCUMENTS

WO 03096697 A1 11/2003
WO 2005088539 A2 9/2005
WO 2006138525 A2 12/2006
WO 2006138730 A2 12/2006

OTHER PUBLICATIONS

Baoxin, Li et al.: "Adaptive video background replacement", Multimedia and Expo, 2001, ICME 2001, IEEE International Conference on Volume, Issue 22-25, Aug. 2001, pp. 269-272.

Gluckman, Joshua et al.: "Real-Time Omnidirectional and Panoramic Stereo", cis.poly.edu/~gluckman/papers/iuw98a.PDF, Booktitle: In Proceedings of the 1998 DARPA Image Understanding Workshop, 19998, pp. 299-303.

Parker, B: "Range Estimation Via Multi-Dimensional Segmentation", Image Processing, 2003, ICIP 2003, Proceedings 2003 International Conference on vol. 1, Issue, Sep. 14-17, 2003 pp. I-993-6 vol. 1, digital object identifier, 10.1109/ICIP.2003.1247132.

Copenheaver, Blaine R.: International Search Report and The Written Opinion of the International Searching Authority, or the Declaration, ISA/US, Commissioner for Patents, Alexandria, VA, completed: Jul. 13, 2009, mailed Jul. 29, 2009.

Demirdjian, David et al.: "Multiple trajectory estimation using stereo and color information", MIT Artificial Intelligence Laboratory, 200 Technology Square, Cambridge, MA 02139, Jul. 16, 2001, all pages.

* cited by examiner

*Primary Examiner* — Brian Werner
*Assistant Examiner* — Utpal Shah

(57) ABSTRACT

Described herein are systems and methods for expanding upon the single-distance-based background denotation to seamlessly replace unwanted image information in a captured image derived from an imaging application so as to account for a selected object's spatial orientation to maintain an image of the selected object in the captured image.

14 Claims, 5 Drawing Sheets

100

OBTAIN AN IMAGE OF A SCENE — 108

OBTAIN A DEPTH MAP OF THE SCENE — 110

IDENTIFY PORTION OF THE IMAGE THAT CORRESPONDS WITH SELECTED OBJECT IN THE SCENE — 112

MAP IDENTIFIED PORTION TO A SET OF COORDINATES IN THE DEPTH MAP — 114

DEFINE A DEPTH SURFACE WITH AT LEAST TWO DIFFERENT DEPTH VALUES — 116

DETERMINE BACKGROUND AND FOREGROUND PORTIONS BASED ON THE DEPTH MAP AND THE DEPTH SURFACE — 118

REPLACE IMAGE INFORMATION IN THE OBTAINED IMAGE BASED ON THE BACKGROUND AND FOREGROUND PORTIONS AND THE DEPTH SURFACE — 120

REPLACING IMAGE INFORMATION IN A CAPTURED IMAGE

BACKGROUND

Videoconferencing, or video calling, has been used to supplement, and in some instances, to replace the traditional face-to-face meeting between people from different physical sites or locations. When properly implemented, videoconferencing can reduce real and opportunity costs to businesses because it cuts down on the travel time and cost required to bring personnel from different locations together for a face-to-face meeting.

As known in the art, videoconferencing or video calling includes the transmission of captured video images between the parties involved. Typically, a captured video image includes two portions: a) a foreground portion that shows the intended object of interest, such as a person or a business presentation involved in the videoconference; and b) a background portion that shows the surrounding environment, such as an office or a location, in which the object of interest is situated. In some instances, videoconferencing parties may be concerned about the improper disclosure of their surrounding environment for security and/or aesthetic reasons. There is also a technology concern of having to maintain an expensive video image transmission bandwidth that may be wasted in transmitting unnecessary background information in a captured image or risk a slow down in the image transmission that may affect the quality of a videoconferencing session.

To remedy the aforementioned problems of capturing unwanted background image information for transmission, typical videoconferencing or video communication systems employ a single distance threshold or color distributions to determine where the background and foreground portions of video images are. The background portion of each video image is then replaced as desired. However, with the use of a single distance threshold, there are instances where one or more parties involved in an imaging application, such as a videoconference or a video call, may be considered part of the background and removed from the video image of the video call. For example, consider a scenario where a person is sitting in a reclining chair while participating in a video call, and a single distance threshold is set behind the chair. Then the resulting virtual depth surface partitioning a transmitted foreground portion and an image-removal background portion of the image would typically be a plane perpendicular to the floor and ceiling, behind the chair. If the person reclines in the chair at a 45-degree angle to the floor, the resulting video image presented to other remote parties involved in the video call would include only the part of the chair and the part of the person that is in the transmitted foreground portion in front of the capture plane. The rest of the chair and the person would be replaced with alternative image information.

Likewise, with the use of color distributions to determine where the where the background and foreground portions of video images are, if the person involved in the video call happens to wear clothing with a color distribution that matches the color distribution of the background, a part or an entire image of the person may be replaced with alternative image information.

Accordingly, there is a desire to effectively replace the background of images in an imaging application, such as a video call, while allowing a call participant to move freely about the camera without the risk of blending the call participants into the background portion and partly or completely eliminating such call participants from the ongoing video image in the video call.

BRIEF DESCRIPTION OF THE DRAWINGS

Embodiments are illustrated by way of example and not limited in the following figure(s), in which like numerals indicate like elements, in which.

DETAILED DESCRIPTION

Figure 1:
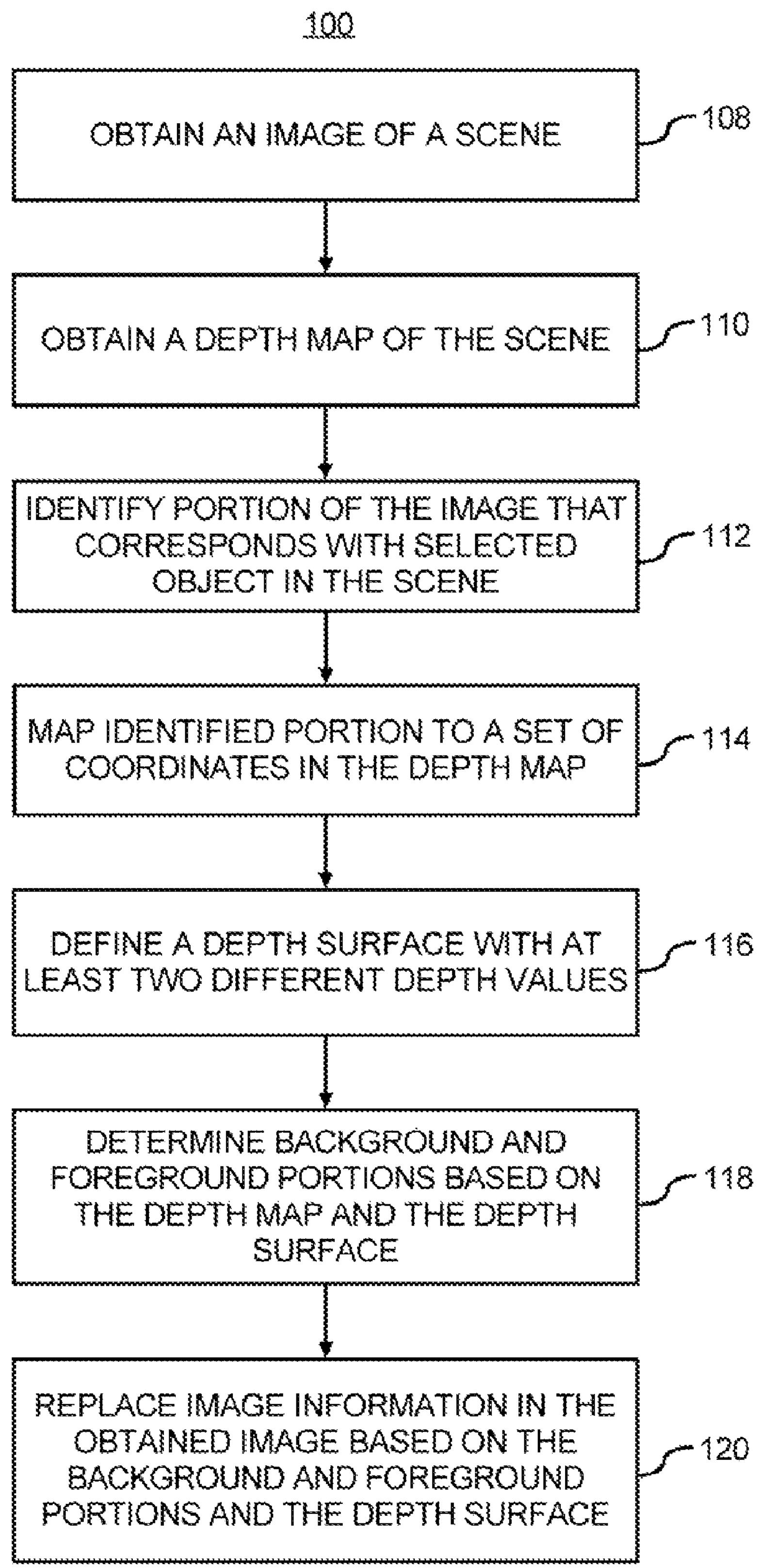
FIG. 1 illustrates a process for replacing information in an imaging application.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Described herein are systems and methods for expanding upon the traditional single-distance-based background denotation to seamlessly replace some or all of the background (foreground, or any other area) of an ongoing video call (or any other obtained image) so as to account for a call participant's spatial orientation to maintain a video image of the call participant in the video call. Instead of a single-distance-threshold background plane, a virtual replacement surface is used whereby such a background replacement surface may be contoured as desired, with different depth values at different sections of such a surface, to allow the camera to capture foreground information on different distances and at different angles to the camera. Furthermore, the virtual replacement surface may be contiguous or non-contiguous (i.e., having multiple separate zones or sections) to provide replacement of background of far away surfaces, surfaces near objects or subjects intended for video imaging and transmission, and surfaces at an angle to the camera. Thus, for example, users of different distances and angles from their respective cameras may participate in a video call with a modified background that maintains images of the users as foreground information for the duration of the video call.

In one embodiment, to accomplish virtual replacement surface thresholds in an environment to be captured for video transmission, object tracking and/or training of surfaces in such an environment is performed to build an accurate background distance template. The accuracy of the depth resolution and, consequently, the quality of the background replacement is dependent on the accuracy of the imaging and depth mapping systems employed. For example, when a stereo camera is employed for both imaging and depth mapping, it may be set up with desired lenses, such as standard lenses or fisheye lenses, with lens-corrected stereo overlapping regions of interest. A number of methods may be used to generate a background map. For example, an initial room-mapping training method may be used, wherein a stereo-based video imaging system (e.g., a video telephony system) is set up in a desired environment to enable the system to document the environment. The system is operable to obtain or create a distance-based image map that acts as a default background field, which takes into account immovable physical boundaries, such as walls, doors, furniture, and allows the object of the video capture, such as a video call participant, to traverse the room freely. In another example, an object-tracking training method may be used, wherein a stereo-based video imaging system (e.g., a video telephony system) is used in an object-tracking mode. While in this mode, the system operates to distinguish the object of the video capture, such as a video call participant, via tracking methods implemented within a processing unit or component in the cameras or external to them Such tracking methods are known in the arts of computer vision and image processing. Simultaneously, a background map is created that excludes the tracked object. Alternative embodiments are contemplated wherein a combination of the above two methods may be used together to achieve greater accuracy in the prediction of user location and background.

FIG. 1 illustrates a process 100 for replacing information in an imaging application, in accordance with one embodiment. As referred herein, an imaging application is any application that involves obtaining still and/or video images, for example, by image or video capture. Examples of an imaging application include but are not limited to video calling or videoconferencing, home video recording, movie filming, and still-picture taking. The process 100 enables a defining or description of an arbitrary virtual contiguous or non-contiguous surface in a scene captured by a video image using depth information and a replacement of at least portions of the image with selected image information.

Figure 2:
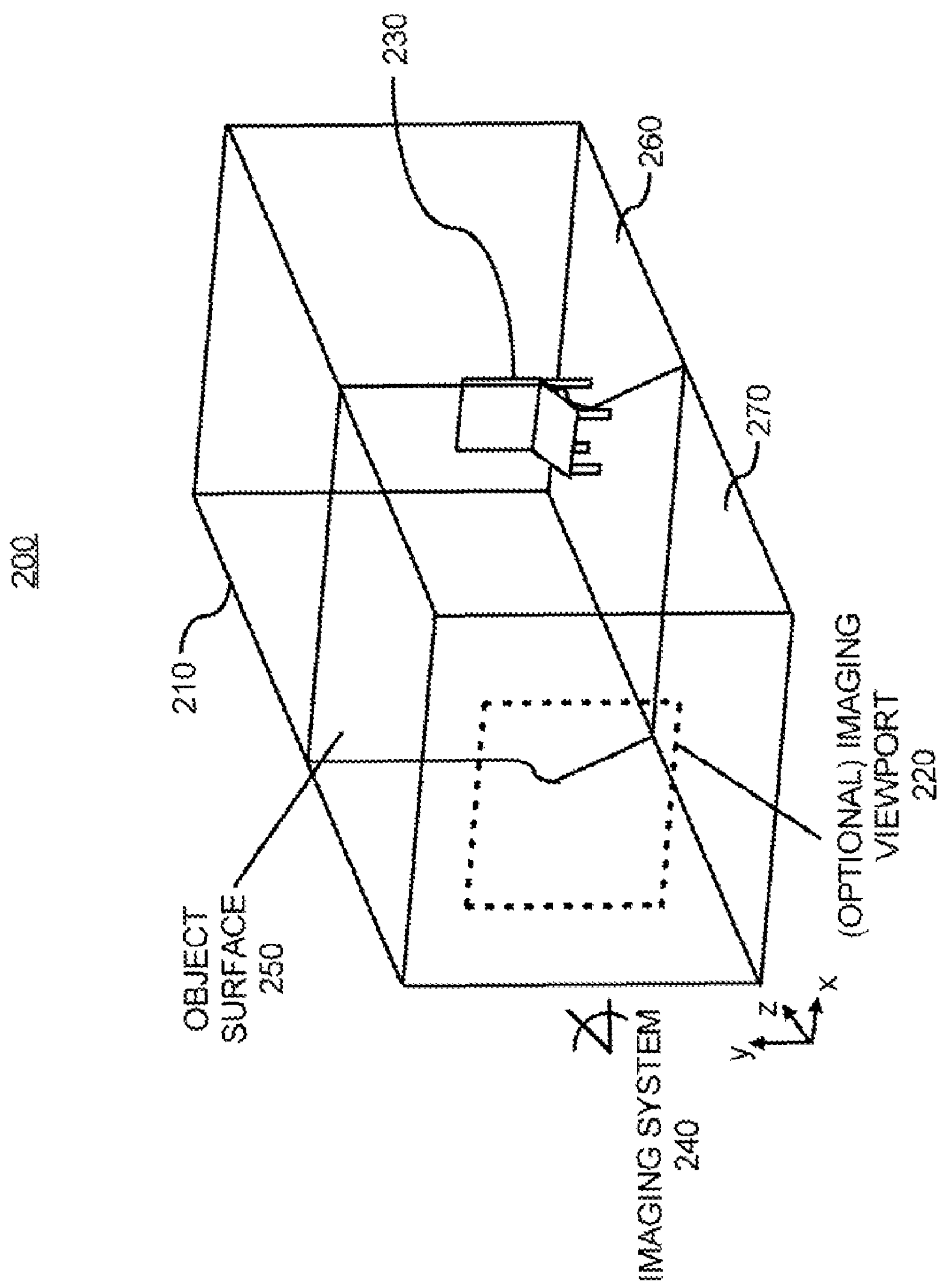
FIGS. 2-5 illustrate various exemplary scenarios for replacing unwanted image information in a captured image.

The process 100 begins at 108, wherein an image of a physical scene or environment is first obtained. The obtained image may be a still or video image, depending on the imaging application employed. As referred herein, a physical scene or environment is an actual volumetric or three-dimensional scene or environment, wherein the volumetric or three dimensions refer to the physical coordinates (height x, width y, and depth z) of the scene or environment. FIG. 2 illustrates an exemplary scenario, wherein the video imaging application is a videoconferencing or video calling application that employs an imaging system 240 operable to obtain an image of a physical scene or environment 210 by capturing still and/or video images of such a physical environment through an optional imaging viewport 220. The imaging system 240 may be stationary or in motion as it operates to capture images of the physical environment 210. Likewise, if used, the imaging viewport 220 also may be stationary or in motion as the imaging system 240 operates (stationary or in motion) to capture images of the physical environment 210. The physical environment 210 may be a conference room, an office, a room in a home, or any desired imaging area. The imaging system 240 may include any device capable of capturing still and/or video images in its view. Examples of the imaging system 240 include known types of still and video cameras.

At 110, a depth map of the same physical environment 210 is obtained. In one embodiment, depth mapping may be dynamically generated in instances where either or both the imaging system 240 and the imaging viewport 220 are in motion during image capturing, which results in changes to the scene or environment 210 and changes in the depth mapping. It should be noted that changes or movements of objects in the scene 210 may also result in changes in the depth mapping. Hence, as described herein, depth mapping is dynamically generated. A depth map provides a three-dimensional mapping of an image, wherein the information contained in the image indicates depths or distance values to parts of the scene. For example, a depth map of a physical environment may be a digital image in which each pixel contains a value that indicates the depth or distance to a portion of the physical environment that is captured in the image pixel of a digital image registered with the depth map. The depth map may be generated in a manner known in the art also by the imaging system 240, which may be a stereo camera (still or video) system, an imaging system that mates a normal still or video camera with an optical or laser rangefinder, or any other imaging system that is operable to measure the depth or distance of objects in a desired image capturing area, such as the physical environment 210. Thus, it should be noted that obtaining an image (e.g., by a normal camera) at 108 may be performed independently from generating a depth map of such an image, e.g., by a rangefinder, a lidar (light detection and ranging), or a radar (radio detection and ranging) at 110 so that these two steps do not constrain one another. Furthermore, various types of optical lenses may be used in an optical/vision system for capturing an image, with computational compensation provided in the depth-map generation for the type of lenses used. Examples of viable optical lenses include but are not limited to normal lenses, wide angle lenses such as fisheye lenses, telephoto lenses, and macro lenses.

Once obtained, the depth map of the physical scene 210 is used to define a depth surface that has at least two different depth values at 112-114. That is, at 112, a portion of the obtained image that corresponds to an object of interest in the scene is identified. For example, referring to the exemplary scenario illustrated in FIG. 2, a chair 230 in which a videoconferencing participant may sit is the object of interest, and a portion of the obtained image that corresponds to the chair 230 is identified. The object of interest may be selected manually (e.g., a user may select a desired object from the depth map or an image) or automatically (e.g., the camera system selects an object in the center of the physical environment or an object closest to the camera view port).

At 114, the identified portion of the obtained image is mapped to a set of three-dimensional coordinates in the depth map so as to calculate or determine the location of the selected object in the physical environment. The selected object may be stationary or in motion, which affects the dynamic mapping of such an object as understood in the art. For example, referring to the exemplary scenario illustrated in FIG. 2, an image pixel representing an object center of the selected object, i.e., the chair 230, in the identified portion of the obtained image is initially mapped to a point identified by three-dimensional coordinates (x,y,z) in the depth map. The coordinates (x,y,z) of this center point or pixel in the depth map are then stored. Next, image pixels in the neighborhood of the object center that also belong to the selected object are similarly mapped to three-dimensional coordinates in the depth map, and such coordinates are also stored. This is repeated until all image pixels that belong to the selected object are mapped to coordinates in the depth map and such coordinates are stored.

In general, the steps 112-114 may be performed by the imaging system 240 or other image processing devices using one or more methods for generating a background map as noted earlier. For example, the imaging system 240 may use an initial room mapping training method to map static objects in the physical environment 210, an object-tracking training method (e.g., facial recognition method) to dynamically identify and map a moving object in the physical environment 210, or both the initial room mapping training and object-tracking training methods to map one or more static and moving objects in the physical environment 210 or to achieve greater accuracy in mapping a single object.

At 116, a surface model with three-dimensional physical coordinate variables (x,y,z) is fitted to the three-dimensional coordinates of the selected object, as mapped in the depth map at 114, to define a desired depth surface based on a surface of the selected object. The desired depth surface is a virtual replacement surface that may be defined from values of the mapped three-dimensional coordinates that represent the surface of the selected object, approximated values of such coordinates, predetermined offsets from the actual coordinate values (e.g., to shift the object surface away from the selected object while contouring the object surface to the surface of the selected object), or any combination thereof. In one embodiment, this surface model may be extended two-dimensionally along an entire width direction (i.e., x direction) and an entire height direction (i.e., y direction) of the physical environment, as mapped in the depth map, to define or generate a three-dimensionally traversing depth surface (having at least two different depth values) that is fitted to the surface of the selected object or an approximation thereof. For example, referring to the exemplary scenario illustrated in FIG. 2, a depth surface 250 is surface fitted to the surface of the chair 230 and extended horizontally along the entire x direction and vertically along the entire y direction of the physical environment 210, as mapped in the depth map. In another embodiment, the depth surface 250 may be extended a predetermined distance along the width and/or height direction, such as along the width and height of the chair 230, for piecewise image replacement of, for example, only image information that is directly behind the chair 230. As illustrated, the depth surface 250 includes a plane that is not parallel to the principal plane of the image as obtained or captured by the imaging system 240, whereby the principal plane of the image is perpendicular to the optical axis of the imaging system. Also as illustrated, the depth surface 250 includes a representation of at least a portion of the surface of the chair 230, namely, the seating area and the back-support area of the chair 230.

Known methods for parametric or non-parametric surface modeling may be employed to generate or define the three-dimensional surface model for the depth surface 250. For example, with parametric surface modeling, the surface model may include one or more parameterized surface equations (i.e., with known coefficients or parameters) that are used to fit one or more selected objects based on their mapped three-dimensional coordinates in the depth map or approximations thereof. One surface equation may be sufficient for the surface model if the depth surface 250 is contiguous. However, multiple surface equations may be included in the surface model if the depth surface 250 is non-contiguous so as to define non-contiguous zones of such a surface. As referred herein, a non-contiguous surface includes multiple separate surfaces that do not abut one another. When parameterized surface equations are not used or otherwise not available to define the depth surface 250, non-parametric surface modeling may be employed to fit one or more selected objects to generate the depth surface 250. For example, a contiguous or non-contiguous depth surface 250 may be represented by an un-predetermined number of local surface patches that are used to fit to three-dimensional coordinate points of one or more selected objects. In another example, a contiguous or non-contiguous depth surface 250 may be represented by sampled three-dimensional coordinate points of the vertices of a triangular tessellation of the surface of one or more selected objects. In general, any known non-parametric modeling techniques may be employed here to define or generate the depth surface 250.

Accordingly, unlike the typical single depth or distance threshold, a depth surface 250 comprising multiple depth or distance values is determined and used here. Furthermore, unlike the single value of distance threshold, the depth surface 250 may be dynamically calculated to take into account the movement of the selected object so as to move with the selected object. That is because the determination of the depth surface 250 may be based on the dynamic mapping of the selected object.

At 118, background and foreground portions of the captured image are determined based on the obtained depth map and depth surface 250. The background portion is determined as those pixels in the captured image that have depth values (i.e., in the z direction) greater than those of corresponding points of the depth surface. The foreground portion is determined as those pixels in the captured image that have depth values (i.e., in the z direction) less than those of corresponding points of the depth surface. Pixels in the captured image that have depth values equal to those of corresponding points of the depth surface may be classified as foreground, background, or neither foreground nor background. For example, referring to the exemplary scenario illustrated in FIG. 2, the portion of the captured image that represents the volumetric region 260 behind the depth surface 250 is considered as the background portion or region; whereas, the portion of the captured image that represents the volumetric region 270 in front of the depth surface 250 is considered as the foreground portion or region.

Figure 3:
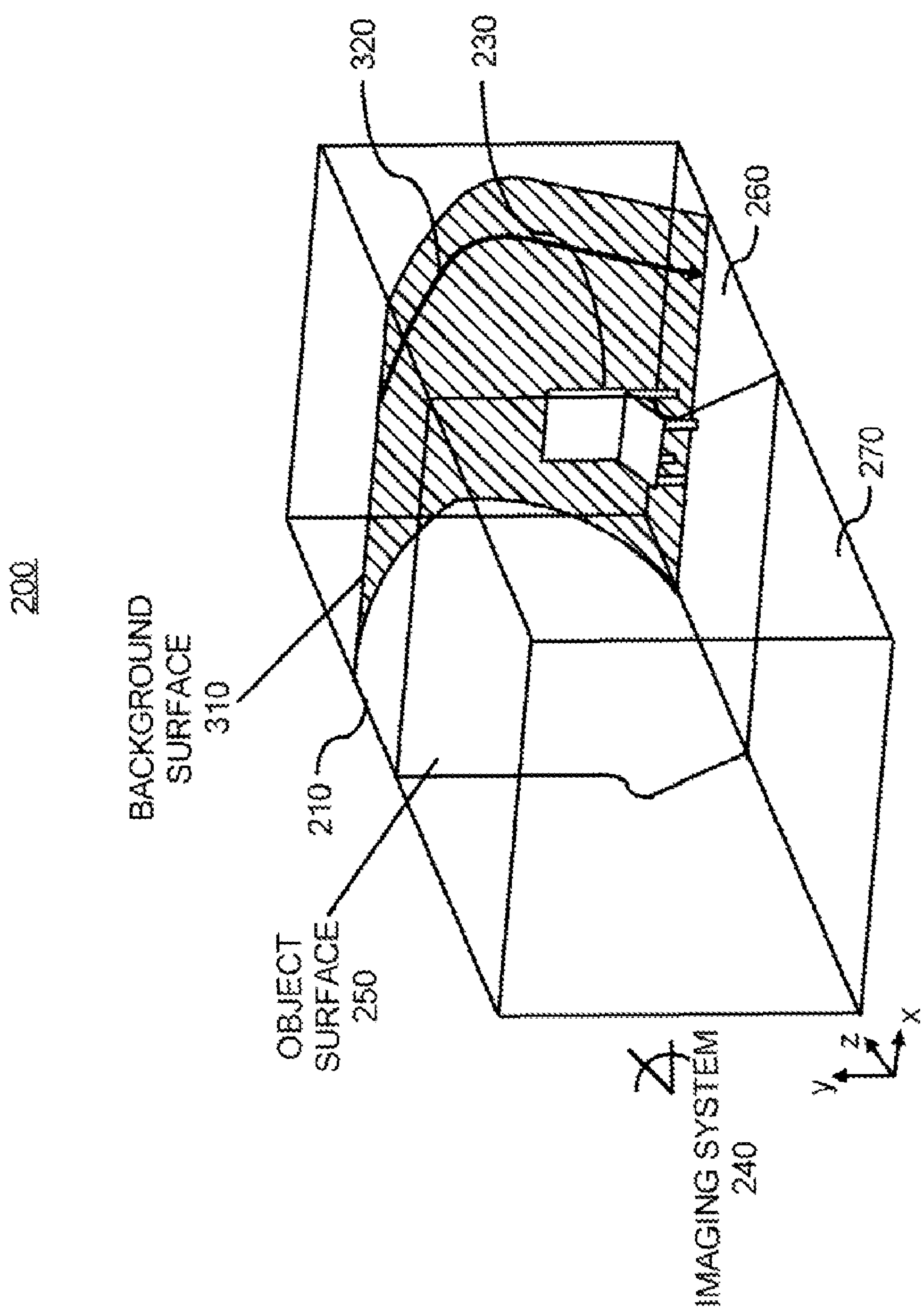
Figure 4:
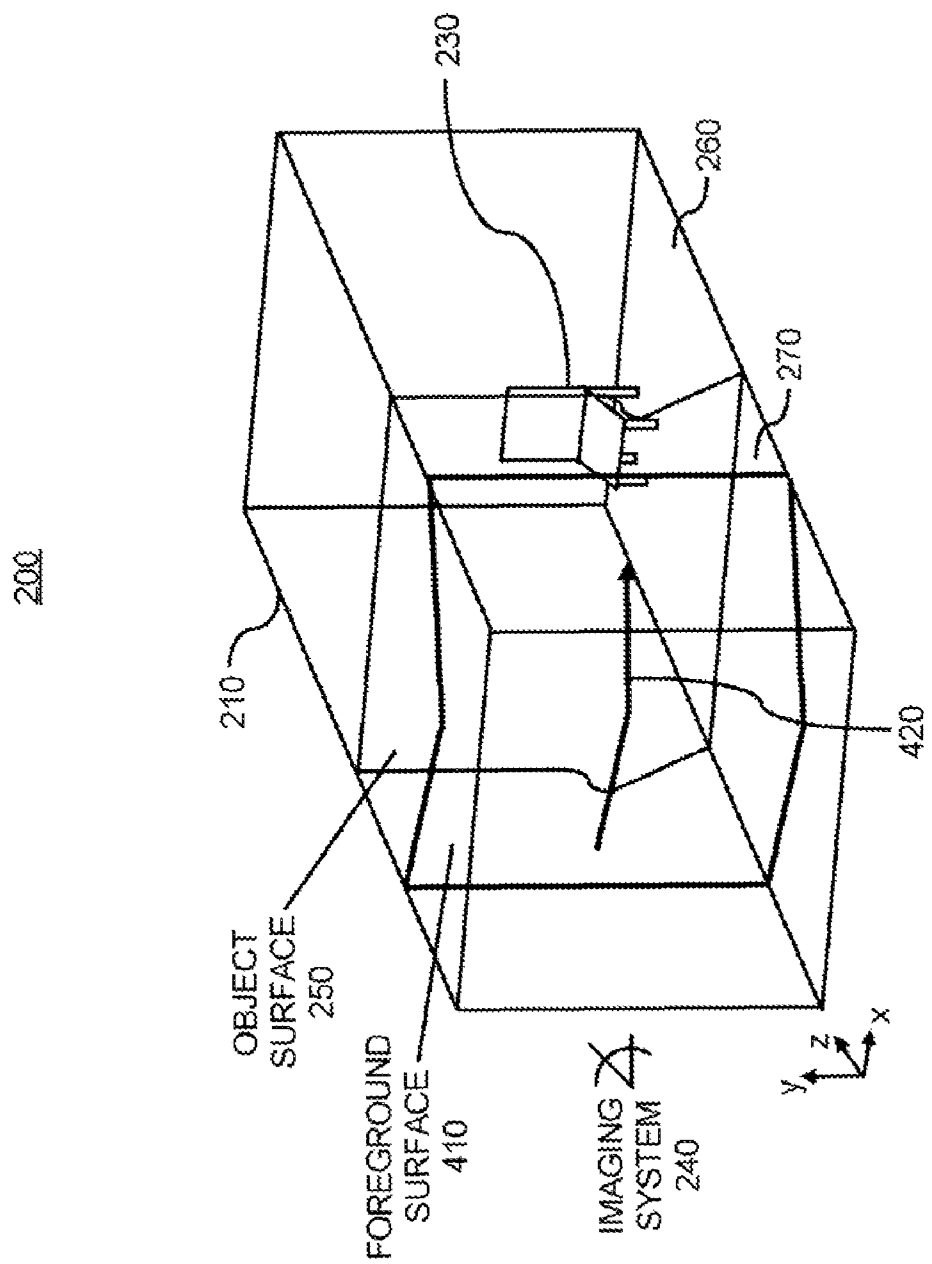
Figure 5:
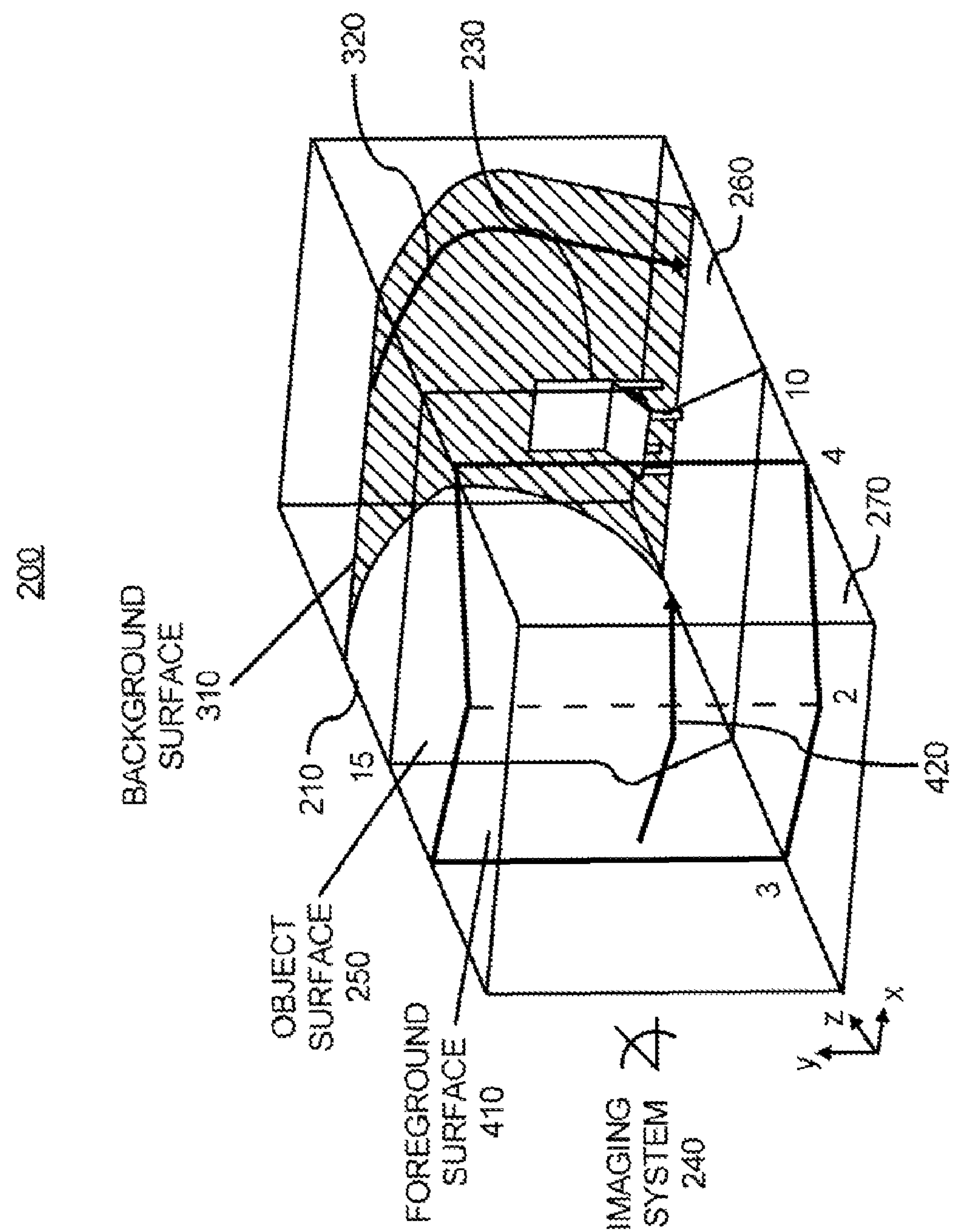

At 120, once the foreground region, the background region, and the depth surface are determined, any part thereof may be replaced with other selected image information as desired. For example, referring to the exemplary scenario illustrated in FIG. 2, pixels in the background region 260 (i.e., pixels in the depth map that have greater depth than the depth surface 250) may be replaced with background pixels that have desired information such as blue pixels to form a blue screen, pixels that form some desired graphic design, such as a company logo, or pixels from another image or video frame. Alternatively or additionally, normal or texture image information may be mapped to the depth surface 250. Thus, a call participant sitting in the chair 230 would appear to be sitting in a formal setting instead of in a physical environment 210, which may be an informal setting, such as a bedroom or kitchen in the participant's home. FIGS. 3-5 illustrate various scenarios for image replacement in the foreground region, background region, and the depth surface.

FIG. 3 illustrates an exemplary scenario wherein a background replacement is performed over a desired background replacement surface 310 behind the depth surface 250, i.e., within the background region 260. The background replacement surface 310 is a virtual replacement surface that may be contiguous or non-contiguous. It may be defined or generated by parametric or non-parametric surface modeling as described earlier such that the depth (i.e., in the z direction) of the background replacement surface 310 is greater than the depth of the depth surface 250. Then, pixels in the obtained image that have a greater depth based on corresponding values in the depth map than the background replacement surface 310 may be replaced with background pixels of desired image information. Alternatively or additionally, normal or texture image information may be mapped onto the background replacement surface 310. The background replacement surface model may be defined by one or more objects in the obtained image that are located behind or in front of the object of interest, e.g., the chair 230. Alternatively, the background replacement surface model may be arbitrarily selected so as to form a desired shape for the background replacement surface 310, such as a curved background replacement surface as illustrated in FIG. 3. Furthermore, a line equation 320 on the background replacement surface 310 may be derived or calculated to map desired background information thereon such that information may be transformed or contoured (rotated, scale, translated) with respect to the direction of the line equation. For example, a ticker tape image displaying current news or the stock market may be presented on background replacement surface 310 along the line equation 320. It should be understood that a line equation may be used to form desired information on the depth surface 250 as well.

FIG. 4 illustrates an exemplary scenario wherein a foreground replacement is performed over a desired foreground replacement surface 410 in front of the depth surface 250, i.e., within the foreground region 270. As with the background replacement surface 310, the foreground replacement surface 410 is a virtual replacement surface that may be contiguous or non-contiguous. It may be defined or generated by parametric or non-parametric modeling as described earlier such that the depth (i.e., in the z direction) of the foreground replacement surface 410 is less than the depth of the depth surface 250. Then, pixels in the obtained image that have less depth, based on corresponding values in the depth map, than the foreground replacement surface 410 may be replaced with foreground pixels of desired image information. Alternatively or additionally, normal or texture image may be mapped to the foreground replacement surface 410. In one embodiment, the replacing pixels that are mapped to the foreground replacement surface 410 may be translucent or otherwise of a color that is sufficient to allow pixel data behind the foreground replacement surface 410 to be partially visible. The foreground replacement surface model may be defined by one or more objects that are located in front of the object of interest, e.g., the chair 230. Alternatively, the foreground replacement surface model may be arbitrarily selected so as to form a desired shape for the foreground replacement surface 410, such as the bent foreground replacement surface as illustrated in FIG. 3. Furthermore, a line equation 420 on the foreground replacement surface 410 may be derived or calculated to map desired background information thereon such that information may be transformed or contoured (rotated, scale, translated) with respect to the direction of the line equation. For example, a ticker tape image displaying current news or the stock market may be presented on foreground replacement surface 410 along the line equation 420.

FIG. 5 illustrates an exemplary scenario wherein image replacement mapping on various replacement surfaces, such as the background replacement surface 310 and the foreground replacement surface 410, may be scaled to create the illusion of depth (e.g., darker colors look more distant) and to blend into the final composite image presented to viewer at the receiving end of the imaging system 240. In one embodiment, brightness, gamma, contrast, transparency, and/or other visual properties may be scaled based on the depth and/or position of the surface from the imaging system 240 or based on the distance and/or direction to the depth surface 250. Thus, properties of the selected image information used to provide image replacement may be modified based on depth and/or position of the virtual replacement surfaces. For example, as illustrated in FIG. 5, if the foreground replacement surface 270 ranges from 3 feet to 2 feet to 4 feet away from the imaging system 240, then the portion of the image mapped to the foreground replacement surface 270 is transformed to have a brightness gradient increasing from the left side to the 'crease' in the surface, and then decreasing to the right side, where the brightness gradient on the left side is less than the brightness gradient on the right side because the magnitude of the slope of the left side from 3 feet to 2 feet is less than the magnitude of the slope on the right side from 4 feet to 2 feet. The image gradient also may follow the curvature of the mapped surface, such as the bent arrow 420 in the foreground replacement surface 410 (or the curved arrow 320 on the background replacement surface 310 if mapped thereto). This is done by calculating the distance between two surfaces at predetermined traversing intervals. It will be understood by those skilled in the art that the above example is for illustrative purposes only, and that the image property modified is not limited to brightness, and that the mapping from depth or depth slope to gradient of any image property is not limited to the mapping described in the example.

In another exemplary scenario, image replacement mapping on various replacement surfaces, such as the background replacement surface 310 and the foreground replacement surface 410, may be scaled based on the previous gradient of the replaced pixels. That is, pixel brightness, gamma, contrast, and/or other visual properties on the replacement surfaces may be scaled based on the gradient of the pixels to be replaced on such surfaces before replacement. Thus, gradient matching may be done to maintain the color consistency in the composite image. For example, referring again to FIG. 5, on the left side of the foreground replacement surface 410 that ranges from 3 feet to 2 feet the gradient of brightness, gamma, and contrast may be calculated and then applied to the new pixels that are to be mapped onto the left side. In addition to gradient, relative scaling may be done with respect to a starting corner (or any designated location) of a replacement surface. That is, for example, if the original pixel luminance is Y=50 at a starting corner that is to be replaced by the replacement surface, and the new pixel value is Y=100 for the starting corner of the replacement surface, the new pixel value may be scaled by 0.5 before gradient scaling is applied. This may be done to visually blend in the replacement surface with the rest of the captured image. Otherwise, as noted in the example, the replacement surface may exhibit a higher luminance than that of the rest of the captured image and cause a visual discrepancy between the replacement surface and the captured image, especially at the boundaries between the two.

In still another exemplary scenario, image replacement mapping on various replacement surfaces 310, 410 may be scaled based on relative distances between the replacement surfaces 310, 410 to the depth surface 250, or the depth surface 250 to the imaging system 240. That is, pixel brightness, gamma, contrast, and/or other visual properties on the replacement surface may change based on a selected object 230 which defines the depth surface 250. This is useful, for example, to create textures such as shadows on the replacement surfaces 310, 410 that dynamically change based on movement of object 230.

Accordingly, as described above, the process 100 may be used to generate or determine a depth surface 250, a background replacement surface 310, and/or a foreground replacement surface 410 that are contiguous or non-contiguous. The process 100 as illustrated in FIG. 1 and exemplified above may be implemented in a general, multi-purpose or single purpose processor. Such a processor will execute instructions, either at the assembly, compiled or machine-level, to perform that process. Those instructions can be written by one of ordinary skill in the art following the descriptions of FIGS. 1-6 and stored or transmitted on a computer readable medium. The instructions may also be created using source code or any other known computer-aided design tool. A computer readable medium may be any physical medium capable of carrying those instructions and include a CD-ROM, DVD, magnetic or other optical disc, tape, silicon memory (e.g., removable, non-removable, volatile or non-volatile), or any transmission medium such as packetized or non-packetized wireline or wireless transmission signals.

Accordingly, the systems and methods as described herein are operable to modify the background and/or foreground of a video call, or any video capturing and transmission application, based on the use of an imaging system and knowledge about the physical environment at which the imaging system is directed. As a result, an object of the video call, such as a call participant, may move freely around the video capturing environment, such as a videoconference room, without concern of the image of objects in the room being transmitted to other participants of the video call.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims—and their equivalents—in which all terms are meant in their broadest reasonable sense unless otherwise indicated.

What is claimed is:

1. A method for replacing image information in an image, the method comprising:

obtaining an image of a scene;

obtaining a depth map of the scene;

defining a depth surface in the depth map, wherein the depth surface includes at least two different depth values;

defining at least one portion of the image based on the depth surface; and replacing the at least one portion of the image with image information;

wherein the step of defining the depth surface comprises:

identifying a portion of the obtained image that corresponds to a selected object in the scene;

mapping the portion of the obtained image that corresponds to the selected object in the scene to a set of coordinates in the depth map;

determining a surface of the selected object based on the mapping of the portion of the obtained image;

fitting a surface model to the determined surface of the selected object; and forming the depth surface by extending the surface model along an entire width direction and an entire height direction of the scene as mapped in the depth map.

2. The method of claim 1 wherein the set of coordinates in the depth map are three-dimensional coordinates, and the step of defining the depth surface further comprises:

defining the depth surface based on at least one of: the three-dimensional coordinates, an approximation of the three-dimensional coordinates, and an offset from the three-dimensional coordinates.

3. The method of claim 1 wherein the step of defining the depth surface comprises at least one of: determining a parametric surface model for the depth surface and determining a non-parametric surface model for the depth surface.

4. The method of claim 1 wherein the depth surface comprises a representation of at least a portion of a surface of the selected object.

5. The method of claim 1 wherein:

the step of mapping the portion of the obtained image includes dynamically mapping the portion of the obtained image that corresponds to the selected object as the selected object moves about in the scene; and the step of defining the depth surface includes dynamically defining the depth surface based on the dynamic mapping of the selected objected in the scene.

6. The method of claim 1 wherein:

the step of defining the depth surface includes dynamically defining the depth surface based on changes in at least one of the obtained image, the obtained depth map, and the scene.

7. The method of claim 1 wherein the step of obtaining the image of the scene comprises:

obtaining the image of the scene with an imaging system that includes one of a normal lens, a wide-angle lens, a telephoto lens, and a macro lens.

8. The method of claim 1 wherein the step of defining at least one portion of the image comprises:

determining a background portion of the image by identifying pixels in the captured image that have depth values greater than depth values of the depth surface; and determining a foreground portion of the image by identifying pixels in the captured image that have depth values less than the depth values of the depth surface.

9. The method of claim 1 further comprising:

modifying properties of the selected image information based on depth values of the depth surface.

10. The method of claim 1 further comprising:

modifying properties of the selected image information so as to match a gradient of the selected image information to a gradient of the at least one portion of the image.

11. The method of claim 1 wherein the image obtained is a video image.

12. The method of claim 1 wherein the steps of obtaining the image of the scene and obtaining the depth map of the scene are performed using a stereo camera.

13. The method of claim 1 wherein the depth surface includes non-contiguous zones.

14. A system to replace image information in an image comprising:

means for obtaining an image of a scene;

means for obtaining a depth map of the scene;

means for defining a depth surface in the depth map, wherein the depth surface includes at least two different depth values;

means for defining at least one portion of the image based on the depth surface; and means for replacing the at least one portion of the image with image information;

wherein defining the depth surface comprises:

identifying a portion of the obtained image that corresponds to a selected object in the scene;

mapping the portion of the obtained image that corresponds to the selected object in the scene to a set of coordinates in the depth map;

determining a surface of the selected object based on the mapping of the portion of the obtained image;

fitting a surface model to the determined surface of the selected object; and forming the depth surface by extending the surface model along an entire width direction and an entire height direction of the scene as mapped in the depth map.

* * * * *